(12) United States Patent
Naka

(10) Patent No.: US 12,487,428 B2
(45) Date of Patent: Dec. 2, 2025

(54) LENS, LENS SUPPORT STRUCTURE, AND LENS BARREL AND CAMERA PROVIDED WITH SAME

(71) Applicant: Panasonic Intellectual Property Management Co., Ltd., Osaka (JP)

(72) Inventor: Yoshio Naka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 804 days.

(21) Appl. No.: 17/562,053

(22) Filed: Dec. 27, 2021

(65) Prior Publication Data
US 2022/0334341 A1 Oct. 20, 2022

(30) Foreign Application Priority Data
Apr. 14, 2021 (JP) .................................. 2021-068434

(51) Int. Cl.
*G02B 7/02* (2021.01)

(52) U.S. Cl.
CPC .................................. *G02B 7/021* (2013.01)

(58) Field of Classification Search
CPC .......... G02B 7/02; G02B 7/022; G02B 7/026; G02B 7/023; G02B 7/021; G02B 7/025; G02B 7/10; G02B 7/102; G02B 7/006; G02B 7/09; G02B 7/14; H04N 23/55; H04N 23/555; H04N 5/225; H04N 5/2254; H04N 2005/2255; G03B 5/06; G03B 3/02; G03B 3/10; G03B 17/14
USPC ........ 359/811, 819, 821–823, 826, 694, 699, 359/700, 701, 704; 396/529, 530, 533, 396/535, 544
See application file for complete search history.

(56) References Cited

U.S. PATENT DOCUMENTS

| | | | |
|---|---|---|---|
| 2001/0028513 A1 | 10/2001 | Takanashi et al. | |
| 2006/0274436 A1* | 12/2006 | Inamoto ................. | G02B 7/023 359/819 |
| 2007/0047110 A1* | 3/2007 | Matsushima .......... | G02B 7/023 359/819 |
| 2011/0317288 A1 | 12/2011 | Bornschein | |
| 2019/0258019 A1 | 8/2019 | OHara et al. | |

FOREIGN PATENT DOCUMENTS

| | | |
|---|---|---|
| JP | S5928107 A | 2/1984 |
| JP | S59-87008 U | 6/1984 |
| JP | S59211008 A | 11/1984 |

(Continued)

OTHER PUBLICATIONS

English translation of JP 2006178236. (Year: 2006).*
(Continued)

*Primary Examiner* — Jie Lei
(74) *Attorney, Agent, or Firm* — Renner, Otto, Boisselle & Sklar, LLP

(57) ABSTRACT

It is an object of the present disclosure to provide a lens with which lens distortion attributable to an external factor can be suppressed and the optical axis of the lens can thereby be accurately adjusted, as well as a lens support structure, a lens barrel provided with this, and a camera. A lens 150 comprises a lens main body 151 that transmits light, and a distortion absorbing portion 151*a* that is provided to the outer peripheral part of the lens main body 151 and deforms more readily than the lens main body 151.

4 Claims, 11 Drawing Sheets

(56) References Cited

FOREIGN PATENT DOCUMENTS

| | | |
|---|---|---|
| JP | S59232305 A | 12/1984 |
| JP | H0550402 U | 7/1993 |
| JP | H8-43701 A | 2/1996 |
| JP | 2000-193862 A | 7/2000 |
| JP | 2004029106 A | 1/2004 |
| JP | 2006178236 A | 7/2006 |
| JP | 2009-25591 A | 2/2009 |
| JP | 2009271122 A | 11/2009 |
| JP | 2011075682 A | 4/2011 |
| JP | 2011-112716 A | 6/2011 |
| JP | 2011237618 A | 11/2011 |
| JP | 2012-513614 A | 6/2012 |
| JP | 2014170124 A | 9/2014 |
| WO | 2018061295 A1 | 4/2018 |

OTHER PUBLICATIONS

Office Action issued in corresponding Japanese Application No. JP2021-068434 dated May 7, 2024, with Machine Translation.
Office Action issued in corresponding Japanese Application No. JP2021-068434 dated Sep. 24, 2024, with Machine Translation.

* cited by examiner

LENS, LENS SUPPORT STRUCTURE, AND LENS BARREL AND CAMERA PROVIDED WITH SAME

CROSS-REFERENCE TO RELATED APPLICATIONS

This application claims priority to Japanese Patent Application No. 2021-068434 filed on Apr. 14, 2021. The entire disclosure of Japanese Patent Application No. 2021-068434 is hereby incorporated herein by reference.

BACKGROUND

Technical Field

The present disclosure relates, for example, to a lens that is included in a lens barrel of a camera, to a lens support structure that supports a lens, a lens barrel provided with this, and a camera.

Description of the Related Art

A lens barrel equipped with an optical system including a plurality of lenses has been used in recent years. In a lens barrel such as this, various adjustment mechanisms have been employed for adjusting the optical axis of the lenses.

For example, in order to provide a low-cost photography lens, an optical device, and a photography lens adjustment method which good optical performance can be achieved, Patent Literature 1 discloses a method for adjusting a photography lens consisting of a first lens group having a negative refractive force, a second lens group having a positive refractive power, a third lens group having a negative refractive power, and a fourth lens group having a positive refractive power, in that order starting from the object side, wherein at least a part of the second lens group is shifted and offset in a direction perpendicular to the optical axis.

CITATION LIST

Patent Literature

Patent Literature 1: JP-A 2011-112716

SUMMARY

Problem to be Solved by the Disclosure

However, the following problems are encountered with the above conventional method for adjusting a photography lens.

That is, with the method for adjusting a photography lens disclosed in the above publication, when the optical axis of the lens is adjusted, if the outer peripheral part of the lens is held by adjustment arms for moving the lens very precisely, the lens may end up being distorted by this holding force, which can adversely affect the optical axis adjustment.

Also, if the lens is fixed to the lens frame or the like with an adhesive, the lens may be distorted due to the curing shrinkage of the adhesive, which can adversely affect the optical axis adjustment.

This lens distortion is particularly pronounced when a lens made of a resin is used instead of a glass lens.

It is an object of the present disclosure to provide a lens with which lens distortion attributable to an external factor can be suppressed and the optical axis of the lens can thereby be accurately adjusted, as well as a lens support structure, a lens barrel provided with this, and a camera.

Means for Solving Problem

The lens according to the present disclosure comprises a lens main body that transmits light, and a distortion absorbing portion that is provided to the outer peripheral part of the lens main body and deforms more readily than the lens main body.

The lens support structure according to the present disclosure comprises a lens, a substantially cylindrical lens frame, a substantially annular auxiliary frame, a first adhesive portion, and a second adhesive portion. The substantially cylindrical lens frame holds the lens on the inner peripheral surface side. The substantially annular auxiliary frame is provided between the outer peripheral part of the lens main body and the inner peripheral surface of the lens frame and, at least partially, deforms more readily than the lens main body. The first adhesive portion adhesively fixes the outer peripheral part of the lens main body and a part of the inner peripheral part of the auxiliary frame. The second adhesive portion adhesively fixes the outer peripheral part of the auxiliary frame and a part of the inner peripheral part of the lens frame.

Effects

With the lens according to the present disclosure, it is possible to accurately adjust the optical axis of a lens by making it less likely that distortion will occur in the lens due to an external factor.

DETAILED DESCRIPTION

Embodiments will now be described through reference to the drawings. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

A lens barrel 100 comprising a lens support structure 50, and a camera 1 provided with the lens barrel 100, both according to an embodiment of the present disclosure, will be described below with reference to FIGS. 1 to 8.

(1) Configuration of Lens Barrel 100

Figure 1:
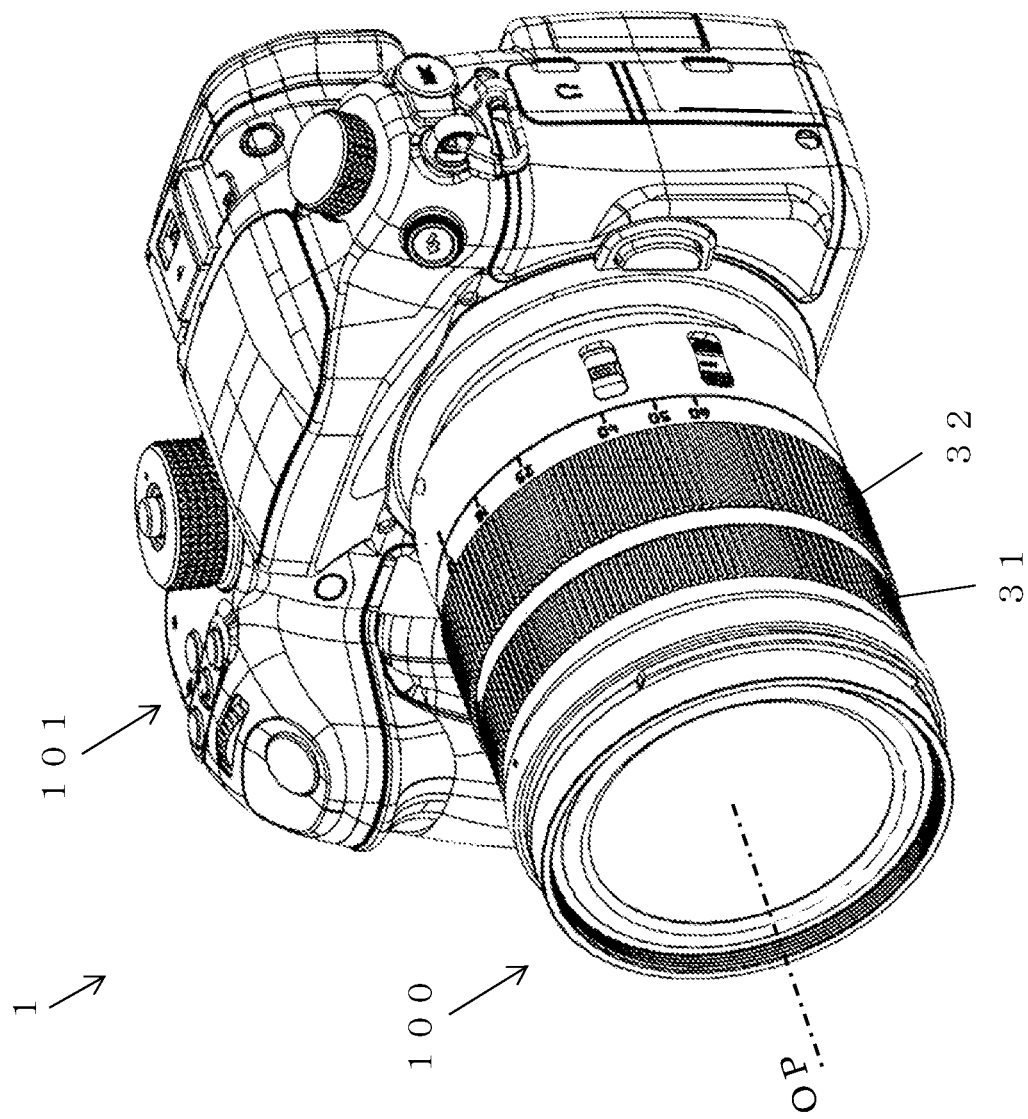
FIG. 1 is an overall oblique view of the configuration of a camera in which the lens barrel according to an embodiment of the present disclosure is mounted to a camera body.

The configuration of the lens barrel 100 according to an embodiment of the present disclosure will now be described with reference to the drawings. FIG. 1 is an oblique view of the camera 1 in which the lens barrel 100 according to the present embodiment is mounted on a camera body 101.

As shown in FIG. 1, the lens barrel 100 is a retractable lens barrel that is removably attached to the camera body 101.

Figure 2:
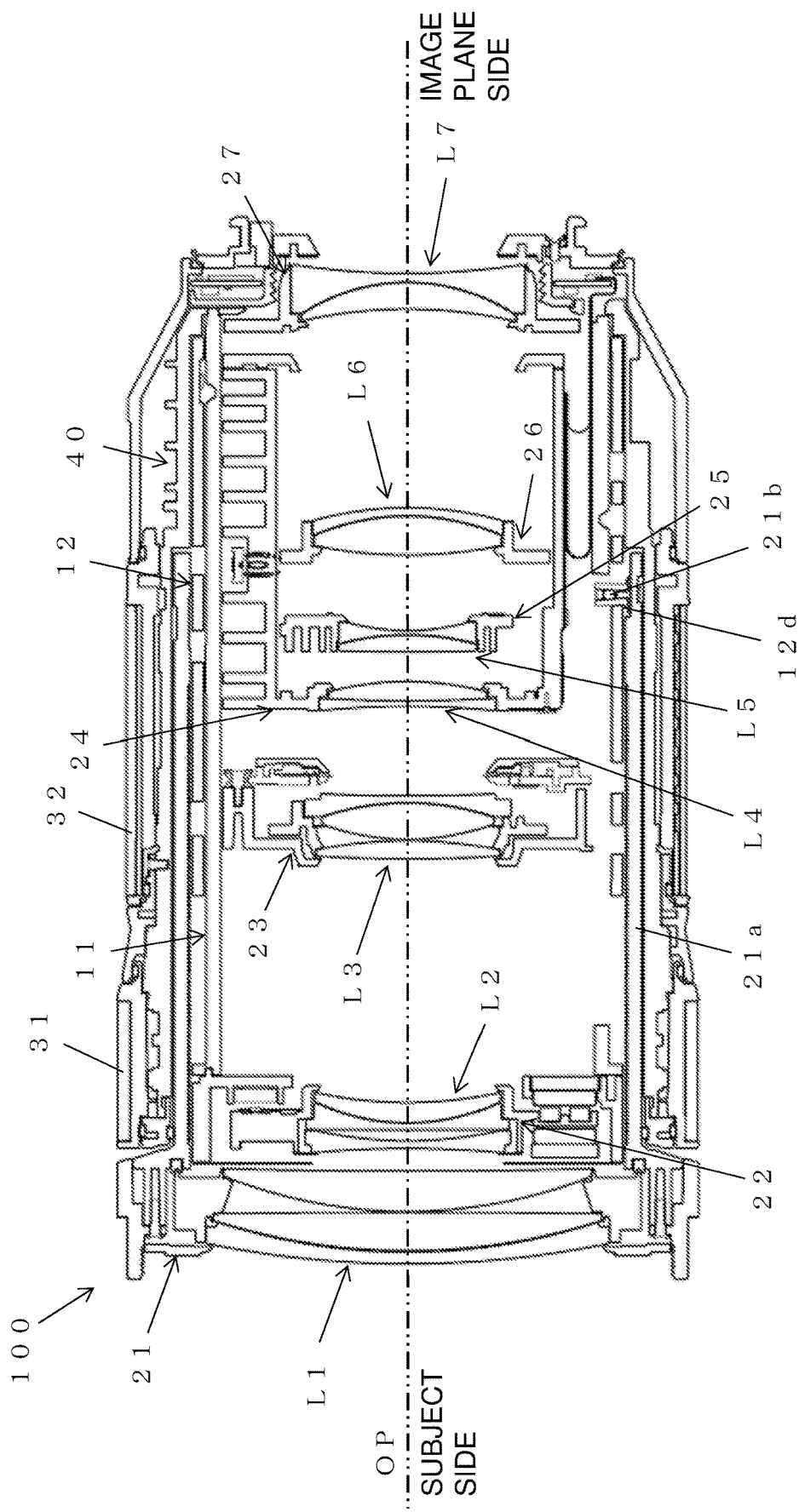
FIG. 2 is a cross-sectional view of the lens barrel in FIG. 1.
Figure 3A:
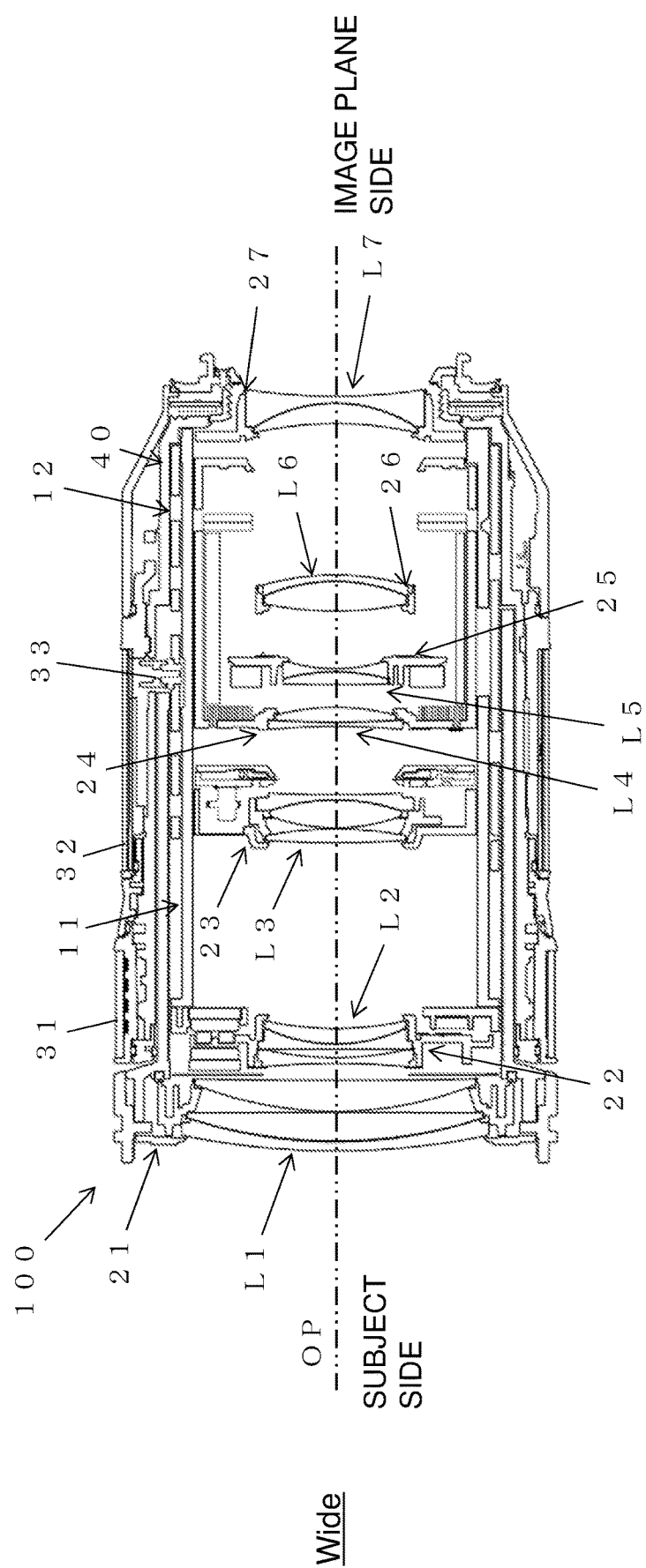
FIG. 3A is a cross-sectional view showing a state in which the lens barrel in FIG. 2 is in the wide angle position.
Figure 3B:
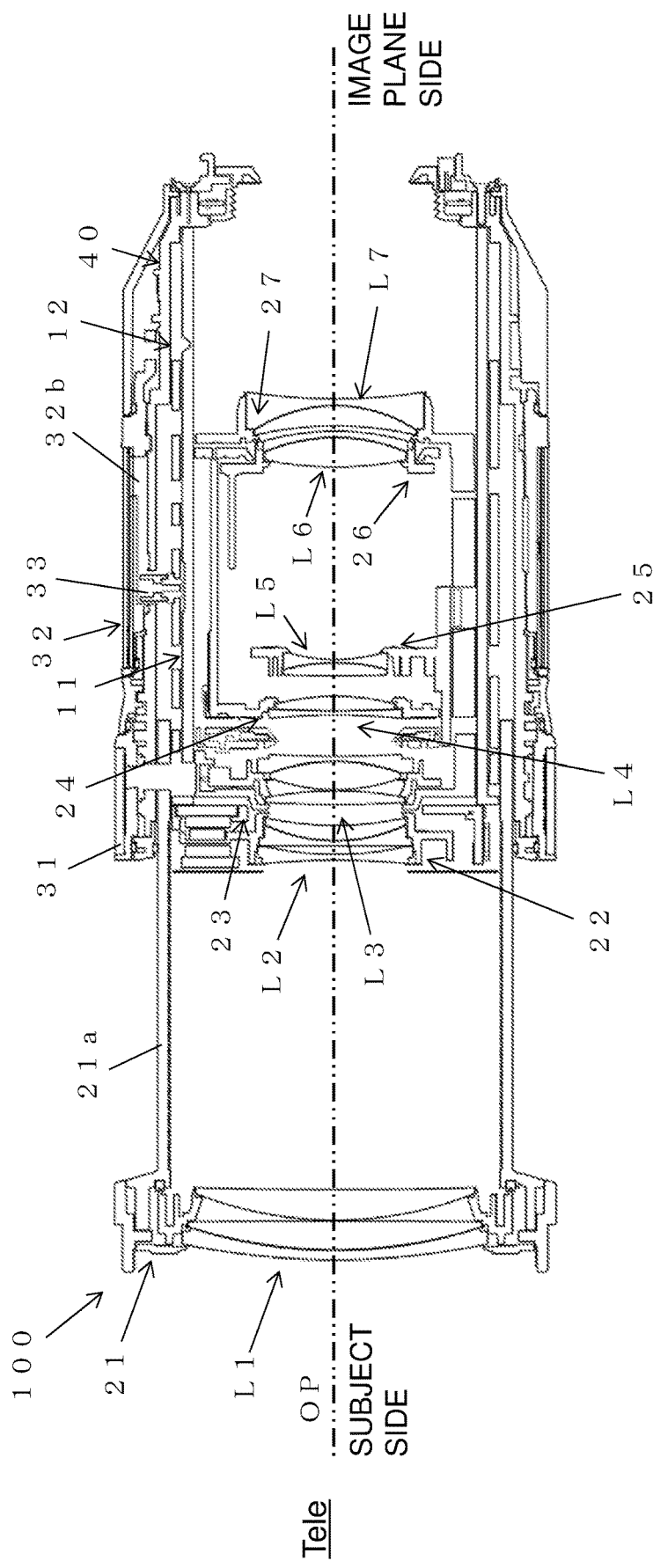
FIG. 3B is a cross-sectional view showing a state in which the lens barrel in FIG. 2 is in the telephoto position.

As shown in FIG. 2, the lens barrel 100 mainly comprises a rectilinear cylinder 11, a cam cylinder 12, a first lens group unit 21, a second lens group unit 22, a third lens group unit 23, a fourth lens group unit 24, a fifth lens group unit 25, a sixth lens group unit 26, a seventh lens group unit 27, a focus ring 31, a zoom ring 32, and a base frame 40.

The lens barrel 100 also comprises a lens support structure 50 that supports the various lens groups in lens frames. The detailed configuration of the lens support structure 50 will be described below.

The first lens group unit 21 is a substantially cylindrical member that is disposed on the outer peripheral surface side of the rectilinear cylinder 11, and holds a first group lens L1 at the end on the subject side in the optical axis OP direction, as shown in FIG. 2. The first lens group unit 21 is disposed closest to the subject in the optical axis OP direction of the lens barrel 100.

As shown in FIG. 2, the first lens group unit 21 has a substantially cylindrical main body portion 21a and a cam follower 21b provided on the inner peripheral surface of the substantially cylindrical main body portion 21a.

The cam follower 21b of the first lens group unit 21 is provided so as to project inward in the radial direction from the outer peripheral surface, near the end on the subject side, on the inner peripheral surface of the substantially cylindrical main body portion 21a. The cam follower 21b is engaged with a rectilinear groove formed in the rectilinear cylinder 11 and a cam groove 12d formed in the cam cylinder 12, and as the cam cylinder 12 rotates, the first lens group unit 21 is moved back and forth in the optical axis OP direction.

The second lens group unit 22 is a substantially annular member included on the inner peripheral surface side of the rectilinear cylinder 11, and holds a second group lens L2 as shown in FIG. 2. The second lens group unit 22 is disposed between the first lens group unit 21 and the third lens group unit 23 in the optical axis OP direction of the lens barrel 100.

The second lens group unit 22 is fixed to the end surface of the rectilinear cylinder 11 on the subject side with screws (not shown).

The third lens group unit 23 is a substantially annular member included on the inner peripheral surface side of the rectilinear cylinder 11, and holds the third group lens L3 as shown in FIG. 2. The third lens group unit 23 is disposed between the second lens group unit 22 and the fourth lens group unit 24 in the optical axis OP direction of the lens barrel 100.

The third lens group unit 23 has a cam follower 23a (see FIG. 4A) provided so as to project outward in the radial direction from the outer peripheral surface.

The fourth lens group unit 24 is a substantially cylindrical member included on the inner peripheral surface side of the rectilinear cylinder 11, and holds the fourth group lens L4 as shown in FIG. 2. The fourth lens group unit 24 is disposed between the third lens group unit 23 and the fifth lens group unit 25 in the optical axis OP direction of the lens barrel 100.

The fourth lens group unit 24 has a cam follower 24a (see FIG. 4A) provided so as to project outward in the radial direction from the outer peripheral surface.

The fifth lens group unit 25 is a substantially annular member included on the inner peripheral surface side of the rectilinear cylinder 11, and holds the fifth group lens L5 as shown in FIG. 2. The fifth lens group unit 25 is disposed between the fourth lens group unit 24 and the sixth lens group unit 26 in the optical axis OP direction of the lens barrel 100. The fifth lens group unit 25 is attached in a state of being suspended from the fourth lens group unit 24 by a guide shaft (not shown) that is attached at one end to the fourth lens group unit 24.

The sixth lens group unit 26 is a substantially annular member included on the inner peripheral surface side of the rectilinear cylinder 11, and holds the sixth group lens L6 as shown in FIG. 2. The sixth lens group unit 26 is disposed between the fifth lens group unit 25 and the seventh lens group unit 27 in the optical axis OP direction of the lens barrel 100. Like the fifth lens group unit 25, the sixth lens group unit 26 is attached in a state of being suspended from the fourth lens group unit 24 by a guide shaft (not shown).

The seventh lens group unit 27 is a substantially annular member included on the inner peripheral surface side of the rectilinear cylinder 11, and holds the seventh group lens L7 as shown in FIG. 2. The seventh lens group unit 27 is disposed on the image plane side, which is on the opposite side from the subject side, in the optical axis OP direction of the lens barrel 100.

The seventh lens group unit 27 has a cam follower 27a (see FIG. 4A) provided so as to project outward in the radial direction from the outer peripheral surface.

Here, the first to seventh group lenses L1 to L7 held by the first to seventh lens group units 21 to 27 are disposed in that order starting from the subject side, with the optical axis OP as the central axis. With the lens barrel 100, when the zoom ring 32 (discussed below) is rotated, the first and third to seventh lens group units 21 and 23 to 27 are moved back and forth along the optical axis OP direction between the wide angle position shown in FIG. 3A and the telephoto position shown in FIG. 3B.

That is, the lens barrel 100 is configured such that when the zoom ring 32, which is rotatably attached to the outer peripheral surface of the base frame 40, is rotated, the cam cylinder 12 rotates along with the rotation of the zoom ring 32. With the lens barrel 100, when the cam cylinder 12 rotates, the first and third to seventh lens group units 21 and 23 to 27 are driven back and forth in the optical axis OP direction.

Figure 4A:
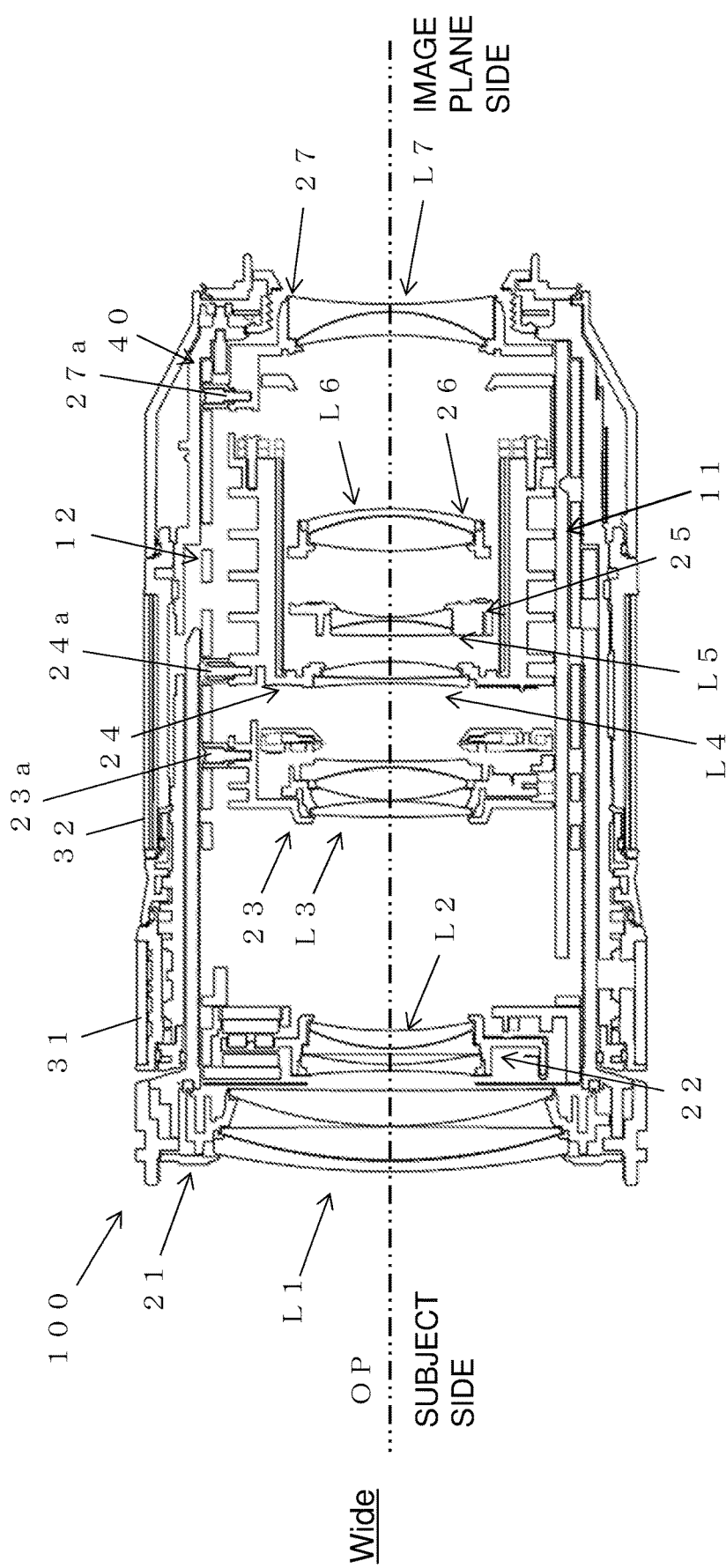
FIG. 4A is a cross-sectional view showing a state in which cam followers of third, fourth, and seventh lens group units are engaged with a cam groove of a cam cylinder at the wide angle position in FIG. 3A.

As shown in FIG. 4A, the first, third, fourth, and seventh lens group units 21, 23, 24, and 27 have a plurality of cam followers (21b, 23a, 24a, and 27a) that respectively engage with a plurality of cam grooves formed in the cam cylinder 12. Also, the cam follower 21b of the first lens group unit 21 engages with the rectilinear groove 11d formed in the rectilinear cylinder 11. Also, the cam followers 23a, 24a, and 27a of the third, fourth, and seventh lens group units 23, 24, and 27 engage with the rectilinear groove 11e formed in the rectilinear cylinder 11.

Furthermore, the cam follower 21b of the first lens group unit 21 engages with the cam groove 12d formed in the cam cylinder 12. Also, the cam followers 23a, 24a, and 27a of the third, fourth, and seventh lens group units 23, 24, and 27 engage with the cam groove formed in the cam cylinder 12.

Figure 4B:
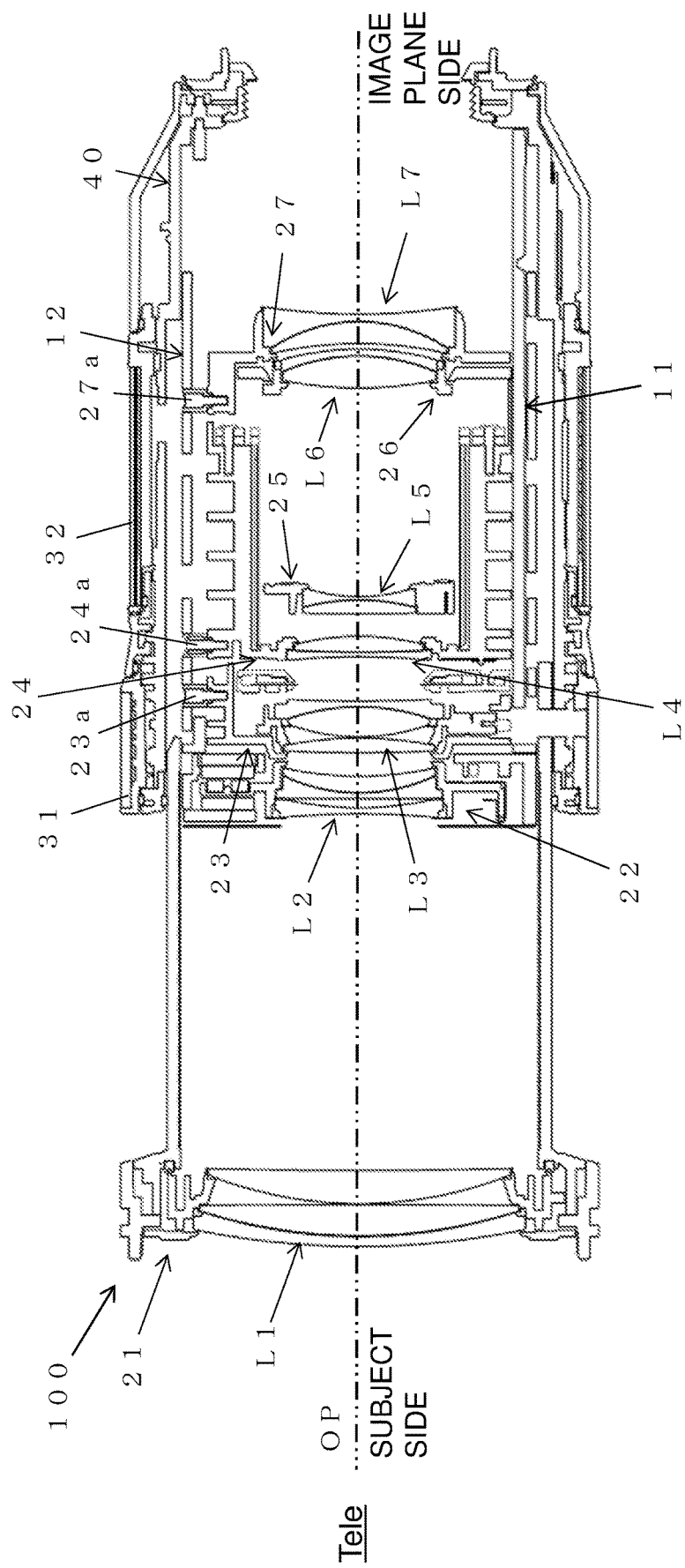
FIG. 4B is a cross-sectional view showing a state in which the cam followers of the third, fourth, and seventh lens group units are engaged with the cam groove of the cam cylinder at the telephoto position in FIG. 3B.

Consequently, when the cam cylinder 12 is rotated with respect to the rectilinear cylinder 11, the first, third, fourth, and seventh lens group units 21, 23, 24, and 27 are driven back and forth relatively in the optical axis OP direction between the wide angle position shown in FIG. 4A and the telephoto position shown in FIG. 4B.

(2) Configuration of Lens Support Structure 50

The configuration of the lens support structure 50 that supports the lenses included in the lens barrel 100 of this embodiment will now be described in detail.

The lens support structure 50 in this embodiment is a structure that supports the first group lens L1 to the seventh group lens L7 in the lens frames of the first lens group unit 21 to seventh lens group unit 27 described above, and is provided to make it less likely that the lenses will be distorted due to an external factor such as an external force, so that the optical axis (alignment) of the lenses can be accurately adjusted.

The description here is not limited to any one specific lens among the above-mentioned first group lens L1 to the seventh group lens to L7, and instead will be given for the support structure of the lenses L in general, through reference to FIGS. 5 to 8.

Figure 5:
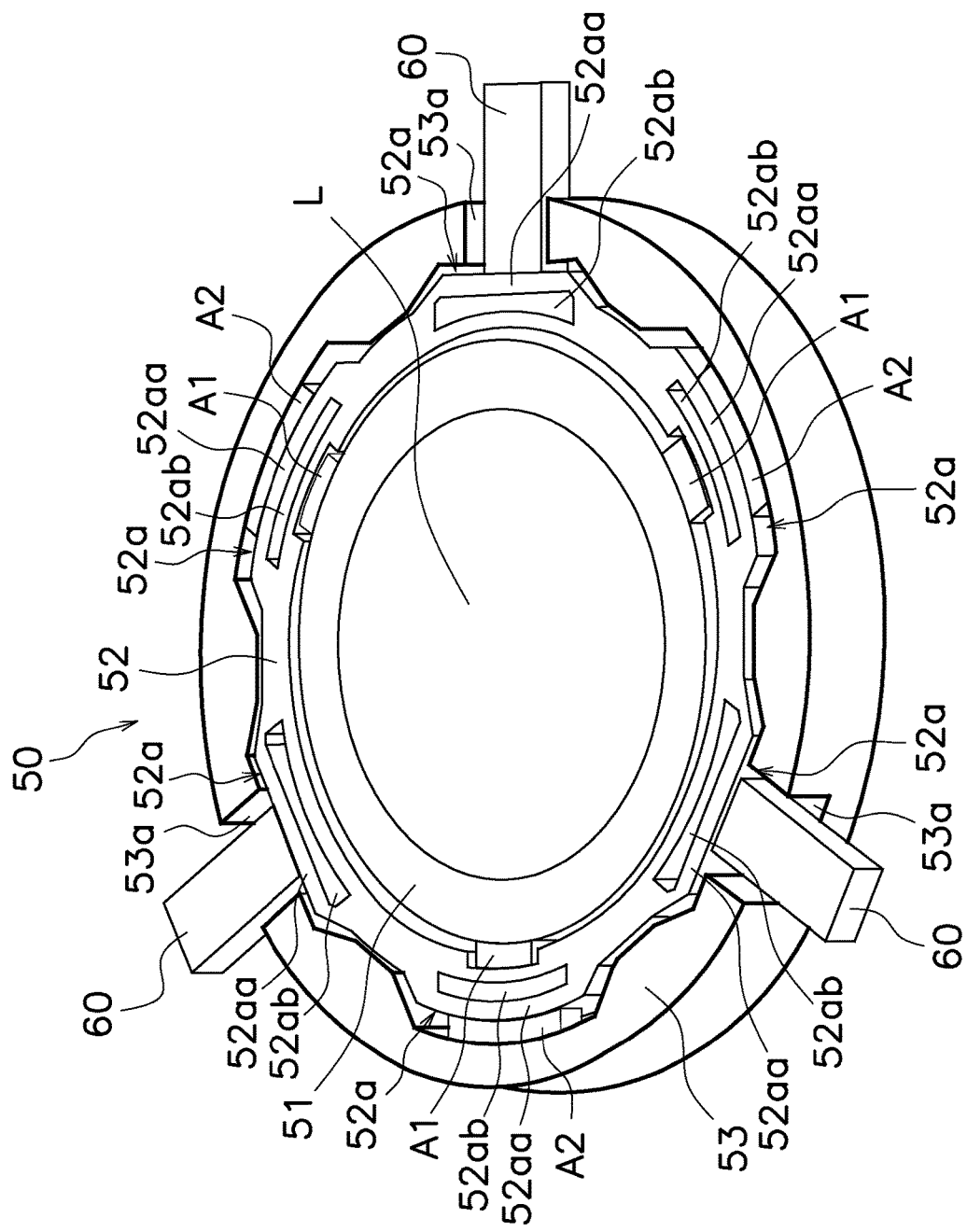
FIG. 5 is a schematic diagram showing the configuration of a lens support structure included in the lens barrel in FIG. 1.

As shown in FIG. 5, the lens support structure 50 in this embodiment comprises a lens main body 51, an auxiliary frame 52, and a lens frame 53.

Figure 6:
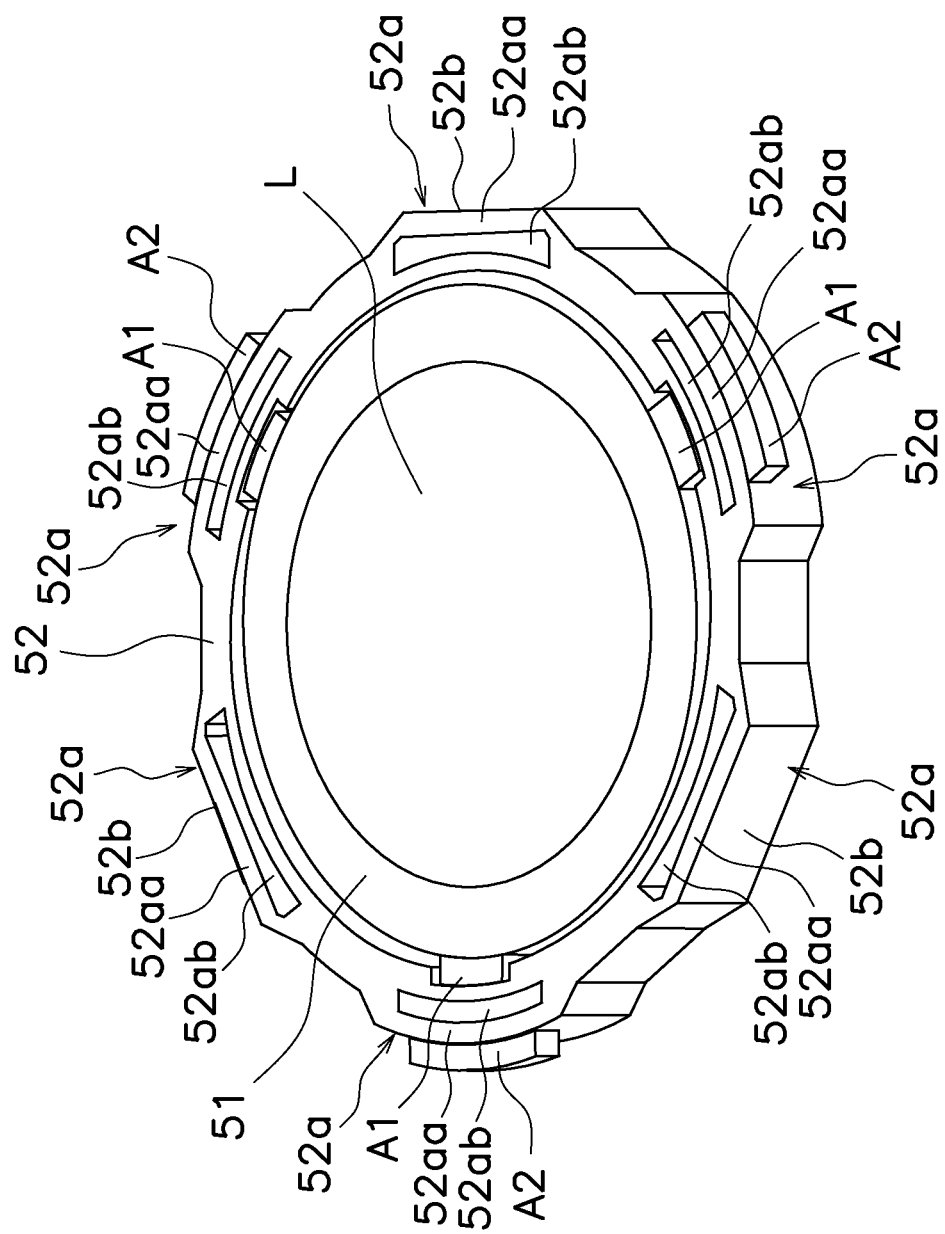
FIG. 6 is an oblique view of an auxiliary frame and a lens disposed on the inner peripheral side of the lens frame included in the lens support structure in FIG. 5.

As shown in FIG. 5, the lens main body 51 is configured to include the lenses L in the central portion. As shown in FIG. 6, the lens main body 51 is disposed on the inner peripheral side of the substantially annular auxiliary frame 52.

Figure 7:
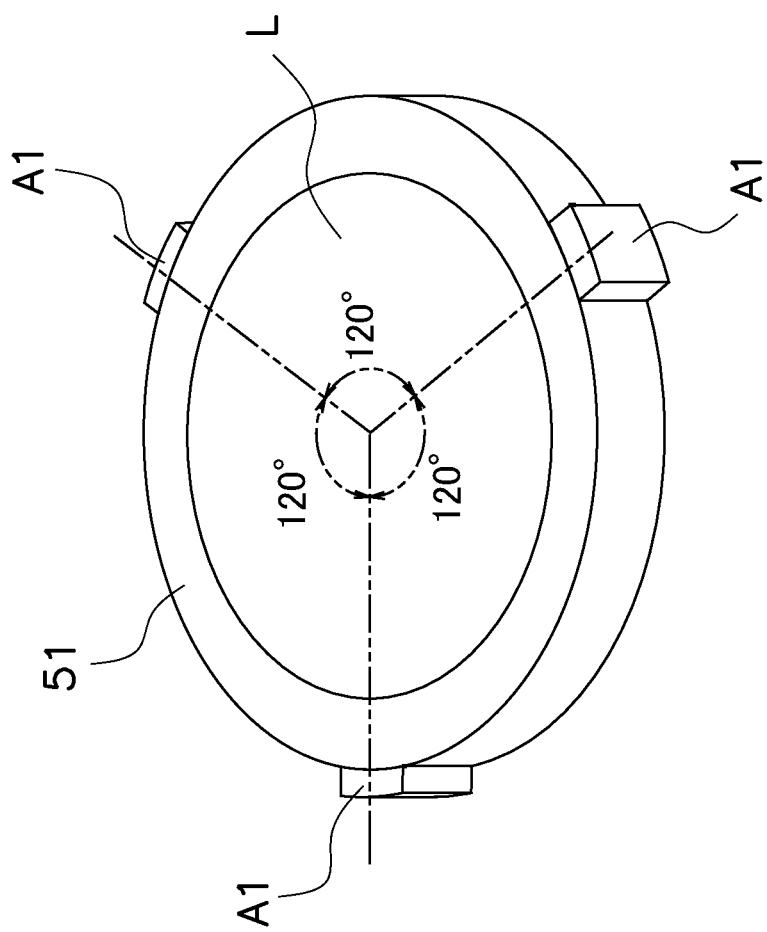
FIG. 7 is an oblique view of the configuration of the lens included in the lens support structure in FIG. 5.

Also, as shown in FIG. 7, the lens main body 51 is formed to be substantially disk shaped, and is fixed to the inner peripheral part of the auxiliary frame 52 via an adhesive A1 (first adhesive) that is applied to the outer peripheral part at three locations spaced apart at equal angles (about 120 degrees). Consequently, the lens main body 51 is supported at three points on the inner peripheral side of the auxiliary frame 52.

The lenses L included in the lens main body 51 are formed from a transparent resin such as D4000, for example.

A UV (ultra violet) curable adhesive is used, for example, as the adhesive (first adhesive) A1 that fixes the outer peripheral part of the lens main body 51 and the inner peripheral part of the auxiliary frame 52. The adhesive A1 is cured in advance, before the optical axis is adjusted using the adjustment arms 60 (discussed below), and fixes the lens main body 51 and the auxiliary frame 52.

As shown in FIGS. 5 and 6, the auxiliary frame 52 is a substantially annular member, and is formed by using a thermoplastic resin such as PC (polycarbonate) containing glass fibers, for example. The auxiliary frame 52 is disposed between the outer peripheral part of the lens main body 51 and the inner peripheral surface of the lens frame 53. As shown in FIG. 6, the auxiliary frame 52 has distortion absorbing portions 52a (a thin-walled portion 52aa and a through-hole 52ab) and a contact surface (contact portion) 52b. Also, the auxiliary frame 52 is fixed to the inner peripheral surface of the lens frame 53 and the outer peripheral part of the lens main body 51 via gaps on the inner and outer sides in the radial direction, except for the portions coated with the adhesives A1 and A2.

Consequently, even if the lens support structure 50 is subjected to an external force, since gaps are formed inside and outside in the radial direction so that the auxiliary frame 52 readily deforms, deformation of the auxiliary frame 52 (distortion absorbing portions 52a) will make it less likely that distortion will occur in the lens main body 51.

Just as with the adhesive A1, a UV (ultra violet) curable adhesive is used for the adhesive (second adhesive) A2 that fixes the outer peripheral part of the auxiliary frame 52 and the inner peripheral part of the lens frame 53, for example. The adhesive A2 is cured in a state in which the optical axis has been adjusted with the adjustment arms 60 (discussed below), and fixes the auxiliary frame 52 and the lens frame 53.

Figure 8:
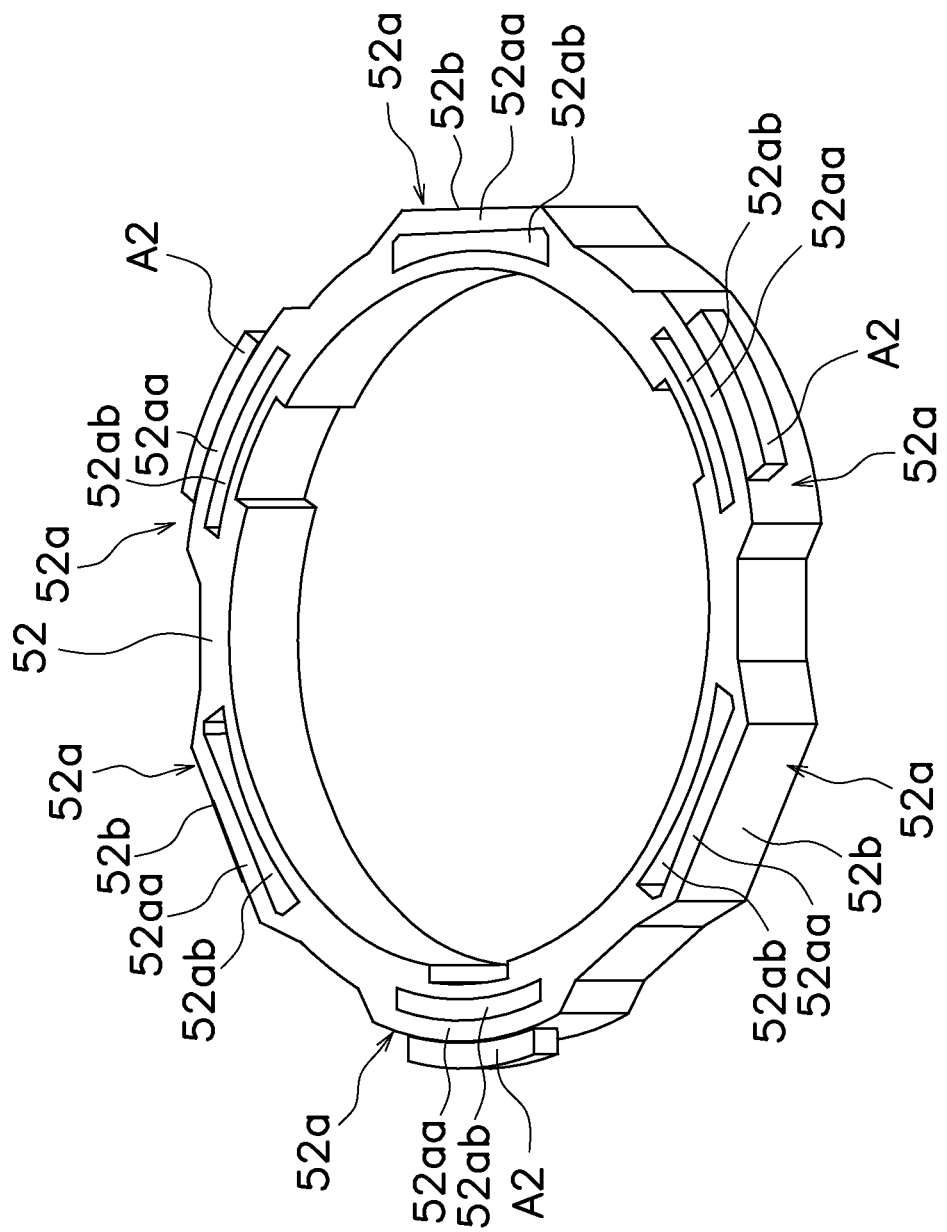
FIG. 8 is an oblique view of the configuration of the auxiliary frame included in the lens support structure in FIG. 5.

As shown in FIG. 8, the distortion absorbing portions 52a are provided at six locations along the circumferential direction of the substantially annular auxiliary frame 52, and have thin-walled portions 52aa and through-holes 52ab.

The thin-walled portions 52aa are formed so as to be thinner in the radial direction than the other portions of the auxiliary frame 52 where the distortion absorbing portions 52a are not provided.

The through-holes 52ab are formed at positions adjacent to the thin-walled portions 52aa in the radial direction, passing through in the optical axis OP direction, along the circumferential direction centered on the optical axis OP of the lens main body 51. This allows the desired positions on the auxiliary frame 52 to be made thinner.

With the lens support structure 50 in this embodiment, in order to absorb the shrinkage of the adhesives A1 and A2 applied to the inner and outer peripheral sides of the auxiliary frame 52, the distortion absorbing portions 52a are provided spaced apart at substantially equal angle intervals (about 120 degrees), matching the locations where the adhesives A1 and A2 are applied.

In particular, the adhesive A2 that is applied and cured during optical axis adjustment is cured by being irradiated with ultraviolet rays after the optical axis of the lenses L is adjusted with the adjustment arms 60, so there is a risk that the optical axis adjustment will become misaligned due to shrinkage during the curing of the adhesive A2.

That is, of the six distortion absorbing portions 52a provided along the circumferential direction of the substantially annular auxiliary frame 52, the three distortion absorbing portions 52a provided at intervals of about 120 degrees are provided in order to absorb any distortion that may occur during shrinkage of the adhesives A1 and A2.

Consequently, even if the adhesive A1 applied to the inner peripheral side and the adhesive A2 applied to the outer peripheral side should shrink in the course of curing, the distortion absorbing portions 52a (thin-walled portions 52aa) will absorb this external force, so the effect of the force on the lens main body 51 supported on the inner peripheral side can be effectively suppressed.

As shown in FIG. 8, the contact surfaces 52b are provided on the outer peripheral part of the auxiliary frame 52, and the adjustment arms 60 for adjusting the optical axis of the lens main body 51 come into contact with these contact surfaces 52b. Also, the contact surfaces 52b are provided on the outer peripheral side to match the positions of the distortion absorbing portions 52a described above.

That is, of the six distortion absorbing portions 52a provided along the circumferential direction of the substantially annular auxiliary frame 52, the remaining three distortion absorbing portions 52a provided at intervals of about 120 degrees are provided in order to absorb any distortion that may occur during optical axis adjustment with the adjustment arms 60.

Consequently, even if the optical axis of the lenses L is adjusted in a state in which the distal ends of the adjustment arms 60 are in contact with the contact surfaces 52b, any distortion caused by an external force applied from the adjustment arms 60 can be absorbed by the distortion absorbing portions 52a provided on the inner peripheral side of the contact surfaces 52b.

As a result, even if an external force is applied from the adjustment arms 60 to the outer peripheral surface of the auxiliary frame 52 during adjustment of the optical axis, it is possible to effectively suppress the occurrence of distortion in the lens main body 51.

As shown in FIG. 5, the lens frame 53 is a substantially cylindrical member, and like the auxiliary frame 52, is formed from a thermoplastic resin such as PC (polycarbonate) containing glass fibers, and has higher strength than the auxiliary frame 52. The lens frame 53 has recesses (adjustment portions) 53a, into which adjustment arms 60 for adjusting the optical axis are inserted, at the end surfaces substantially perpendicular to the optical axis OP direction.

The recesses 53a are provided at positions that are offset in the circumferential direction from the positions where the distortion absorbing portions 52a of the auxiliary frame 52 fixed by the adhesive A2 are provided on the inner peripheral side of the lens frame 53.

Consequently, when adjusting the optical axis of the lenses L, the adjustment arms 60 are inserted at positions that are offset in the circumferential direction from the positions where the adhesives A1 and A2 are applied, and adjustment can be performed while the contact surfaces 52b of the auxiliary frame 52 are supported at three points.

Main Features

As described above, the lens support structure 50 in this embodiment comprises the lens main body 51, the substantially cylindrical lens frame 53, the substantially annular auxiliary frame 52, and the adhesives A1 and A2. The substantially cylindrical lens frame 53 holds the lens main body 51 on the inner peripheral side. The substantially annular auxiliary frame 52 is provided between the outer peripheral part of the lens main body 51 and the inner peripheral surface of the lens frame 53, and at least a part thereof deforms more readily than the lens main body 51. The adhesive A1 adhesively fixes the outer peripheral part of the lens main body 51 and some of the inner peripheral part of the auxiliary frame 52. The adhesive A2 adhesively fixes the outer peripheral part of the auxiliary frame 52 and some of the inner peripheral part of the lens frame 53.

That is, with the lens support structure 50 in this embodiment, distortion absorbing portions 52a that deform more readily than the lens main body 51 are provided to the outer peripheral part of the lens main body 51 including the lenses L.

The distortion absorbing portions 52a are provided in order to absorb any distortion of the lenses L caused by an external force exerted from the outside (an external force from the adjustment arms 60, shrinkage of the adhesives A1 and A2, etc.). As shown in FIGS. 5 and 6, a total of six of the distortion absorbing portions 52a are provided to the outer peripheral part of the annular auxiliary frame 52, with three matching the positions where the adhesives A1 and A2 are applied and three matching the positions that come into contact with the distal ends of the adjustment arms 60 used during adjustment of the optical axis, with each group of three separated by about 120 degrees from one another.

Consequently, any distortion caused by the main external force exerted on the lens support structure 50 in this embodiment (the shrinkage force of the adhesives A1 and A2, the contact pressure of the adjustment arm 60, etc.) can be absorbed by the distortion absorbing portions 52a provided to the auxiliary frame 52.

As a result, distortion is absorbed by the distortion absorbing portions 52a of the auxiliary frame 52, so the influence of the external force causing the distortion on the lens main body 51 can be eliminated and the optical axis adjustment can be carried out very accurately.

Also, the distortion absorbing portions 52a have the thin-walled portions 52aa and the through-holes 52ab. The through-holes 52ab are formed at a position adjacent to the inside of the thin-walled portions 52aa in the radial direction.

Consequently, the thin-walled portions 52aa are formed as portions that are thinner in the radial direction of a circle centered on the optical axis OP, than the other parts of the auxiliary frame 52, and therefore these portions are lower in strength and deform more readily than the lens main body 51, in which distortion is undesirable.

Other Embodiments

An embodiment of the present disclosure was described above, but the present disclosure is not limited to or by the above embodiment, and various changes can be made without departing from the gist of the disclosure.

(A)

In the above embodiment, an example was given in which components were supported on the inner peripheral surface of the lens frame 53 via the substantially annular auxiliary frame 52 provided on the outer peripheral side of the lens main body 51, but the present disclosure is not limited to this.

Figure 9:
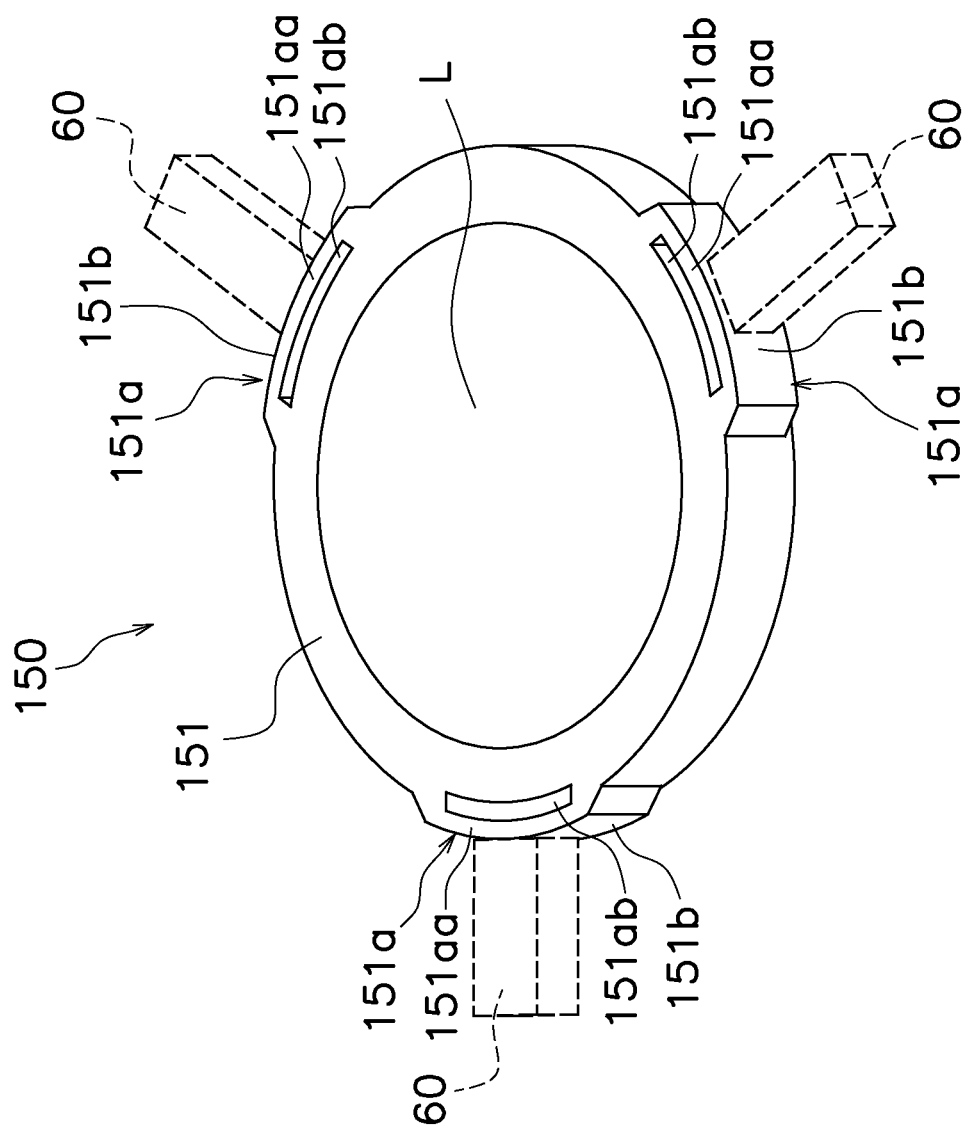
FIG. 9 is an oblique view of the configuration of a lens according to another embodiment of the present disclosure.

For instance, as shown in FIG. 9, the present disclosure may be realized as a lens 150 in which the auxiliary frame is integrated with the lens main body 151, that is, a configuration without any auxiliary frame.

As shown in FIG. 9, the lens 150 has distortion absorbing portions 151a on the outer peripheral part of the lens main body 151, and these portions are more readily deformed than the lens main body 151.

As shown in FIG. 9, three distortion absorbing portions 151a are provided on the outer peripheral part of the substantially circular lens main body 151 at intervals of about 120 degrees.

The distortion absorbing portions 151a have thin-walled portions 151aa and through-holes 151ab. The through-holes 151ab are formed at positions adjacent to the inside of the thin-walled portions 151aa in the radial direction.

Consequently, the thin-walled portions 151aa are portions having a thinner wall thickness than the other sites of the outer peripheral part of the lens main body 151, and their strength is lower and they deform more readily than these other sites of the lens main body 151.

Also, the distortion absorbing portions 151a (thin-walled portions 151aa) are integrally molded from the same resin along with the lens main body 151, on the outer peripheral part of the lens main body 151.

Here, just as in the above embodiment, D4000 or another such transparent resin is used, for example, as the resin for integrally molding the lens main body 151 and the distortion absorbing portions 151a.

Furthermore, as shown in FIG. 9, contact surfaces 151b (contact portions), with which the adjustment arms 60 used for adjusting the optical axis of the lens 150 comes into contact, are provided to the outer periphery of the portion of the lens main body 151 where the distortion absorbing portions 151a are provided.

Consequently, with the lens 150, the optical axis of the lenses L can be adjusted in a state in which the adjustment arms 60 are in contact with the outer peripheral surface (contact surfaces 151b) of the lens main body 151.

(B)

With the lens support structure 50 in the above embodiment, an example was given in which the lens main body 51 was supported together with the auxiliary frame 52 with respect to the inner peripheral surface of the lens frame 53, but the present disclosure is not limited to this.

For instance, a lens support structure may be used in which the lens main body including the distortion absorbing portions is attached to something other than the lens frame.

(C)

In the above embodiment, an example was given in which the thin-walled portions 52aa were provided as the portions (distortion absorbing portions 52a) of the auxiliary frame 52 that were more readily deformed than the lens frame 53, but the present disclosure is not limited to this.

For instance, the distortion absorbing portions that absorb distortion related to the lens main body may be configured in some other mode, such as a combination with a readily deformable material, in addition to a thin-walled mode in which the wall thickness is made thinner than other parts.

Also, as to the mode of the thin-walled portions, in addition to the mode in which these portions are adjacent to through-holes, a configuration may be used in which these portions are made thinner by concave portions.

(D)

In the above embodiment, an example was given in which the adhesives A1 and A2 provided as the first adhesive portion and the second adhesive portion were disposed on the same straight line running along the radial direction, but the present disclosure is not limited to this.

For instance, the first adhesive and the second adhesive may be provided at positions that are offset in the circumferential direction.

(E)

In the above embodiment, an example was given in which the adhesives A1 and A2 provided as the first adhesive portion and the second adhesive portion were the same UV-curing adhesive, but the present disclosure is not limited to this.

For instance, different types of adhesives may be used for the first adhesive and the second adhesive.

(F)

In the above embodiment, an example was given in which the lens main body 51 was molded from resin, but the present disclosure is not limited to this.

For instance, in a configuration in which components are supported on the inner peripheral surface side of the lens frame via an auxiliary frame, the lens main body may be made of glass.

However, since the occurrence of distortion due to external forces or the like is a problem that is particularly likely to appear in a resin lens, it is more effective to apply the present disclosure to a lens support structure including a resin lens.

Also, the resin lens main body is not limited to being made from D4000 resin, and may instead be molded from some other resin.

(G)

In the above embodiment, an example was given in which six distortion absorbing portions 52a were provided at substantially equal angles (about 60 degrees) in the circumferential direction, but the present disclosure is not limited to this.

For instance, the layout of the thin-walled portions is not limited to six locations at equal-angle intervals, and may instead be unequal-angle intervals, five locations or less, or seven or more locations.

(H)

In the above embodiment, an example was given in which three distortion absorbing portions 52a were provided to the auxiliary frame 52, three to deal with shrinkage of the adhesives A1 and A2 and three to deal with contact pressure from the adjustment arms 60, with each group of three separated by about 120 degrees from one another, but the present disclosure is not limited to this.

For instance, the number of distortion absorbing portions provided according to the locations where the external force is applied does not have to be the same.

(I)

In the above embodiment, an example was given in which the lens main body 51 and the auxiliary frame 52, and the auxiliary frame 52 and the lens frame 53 were fixed to each other with the adhesives A1 and A2, but the present disclosure is not limited to this.

For instance, the lens main body and the auxiliary frame, and the auxiliary frame and the lens frame may be fixed to each other by some means other than adhesives.

(J)

In the above embodiment, an example was given in which the auxiliary frame 52 and the lens frame 53 were molded using a thermoplastic resin such as PC (polycarbonate) containing glass fibers, but the present disclosure is not limited to this.

For instance, the auxiliary frame and the lens frame may be molded from separate materials, or may be formed from mutually different materials.

INDUSTRIAL APPLICABILITY

The lens of the present disclosure has the effect of suppressing lens distortion attributable to external factors and allowing accurate adjustment of the optical axis of the lens, and therefore is widely applicable to various devices that include lenses.

The invention claimed is:
1. A lens, comprising:
a lens main body configured to transmit light;
a distortion absorbing portion that is integrally molded from a same resin along with the lens main body is provided on an outer peripheral part of the lens main body and is more easily deformed than the lens main body; and a contact portion that is provided on an outer periphery of a portion of the lens main body where the distortion absorbing portion is provided and that comes into contact with adjustment arms for adjusting an optical axis of the lens main body.

2. The lens according to claim 1,
wherein three distortion absorbing portions are provided to the substantially circular outer peripheral part of the lens main body at intervals of approximately 120 degrees.

3. The lens according to claim 1,
wherein the distortion absorbing portions have a thin-walled portion.

4. The lens according to claim 3,
wherein the distortion absorbing portions further have a through-hole formed along a circumferential direction centered on an optical axis of the lens main body, at a position adjacent to the thin-walled portion.

\* \* \* \* \*